Figure 1:
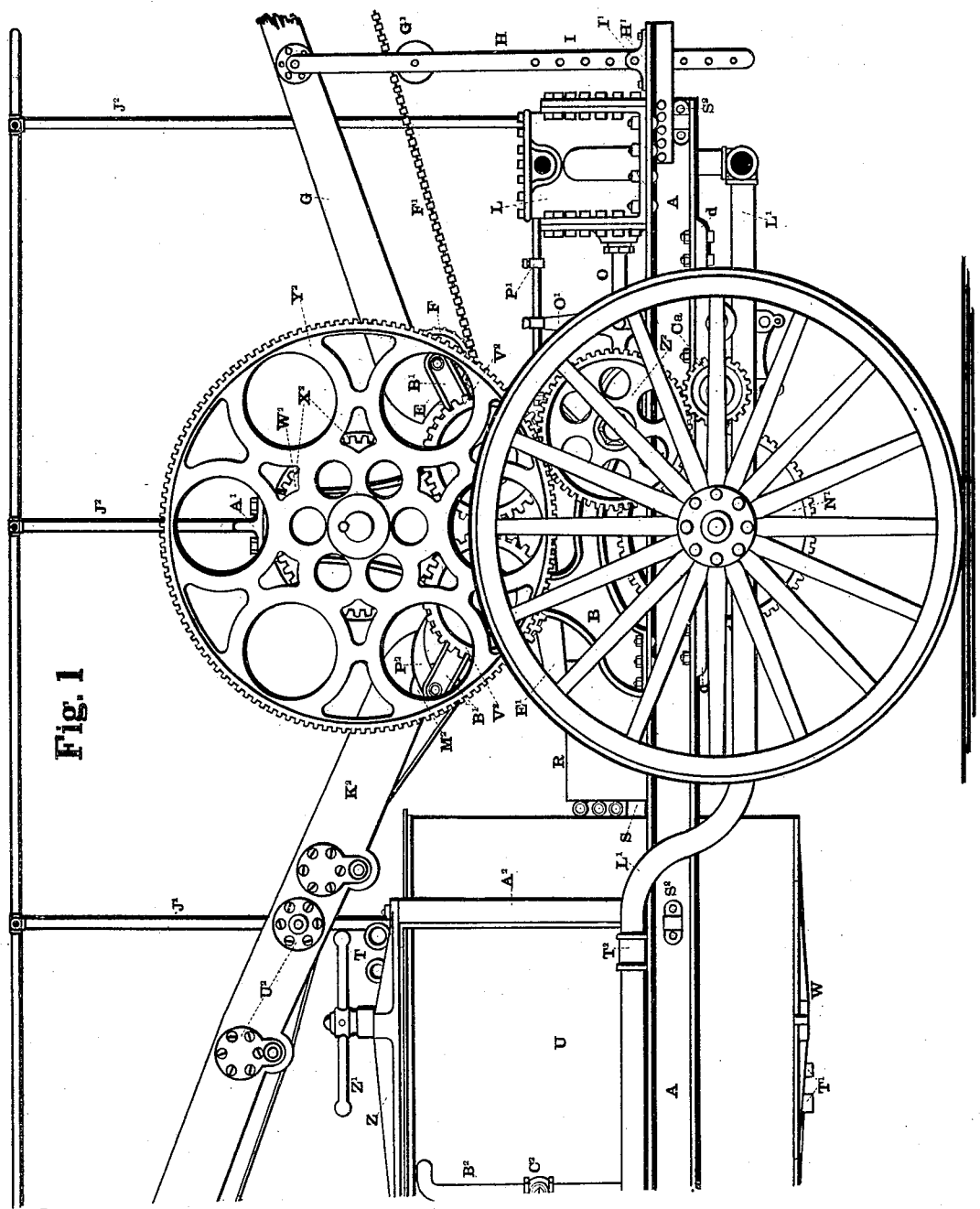

(No Model.) 15 Sheets—Sheet 1.

W. F. BROWNE.
PROCESS OF AND APPARATUS FOR THE MANUFACTURE OF SIRUP AND SUGAR.

No. 263,314. Patented Aug. 29, 1882.

Witnesses.
H. W. Higgins.
R. L. Higgins.

Inventor
Wm Frank Browne (No Model.)  15 Sheets—Sheet 4.

W. F. BROWNE.
PROCESS OF AND APPARATUS FOR THE MANUFACTURE OF SIRUP AND SUGAR.

No. 263,314.  Patented Aug. 29, 1882.

Fig. 2ª

Witnesses
A. W. Higgins.
R. L. Higgins.

Inventor
Wm Frank Browne (No Model.)  W. F. BROWNE.  15 Sheets—Sheet 6.

PROCESS OF AND APPARATUS FOR THE MANUFACTURE OF SIRUP AND SUGAR.

No. 263,314.  Patented Aug. 29, 1882.

(No Model.)  15 Sheets—Sheet 7.
W. F. BROWNE.
PROCESS OF AND APPARATUS FOR THE MANUFACTURE OF SIRUP AND SUGAR.

No. 263,314. Patented Aug. 29, 1882.

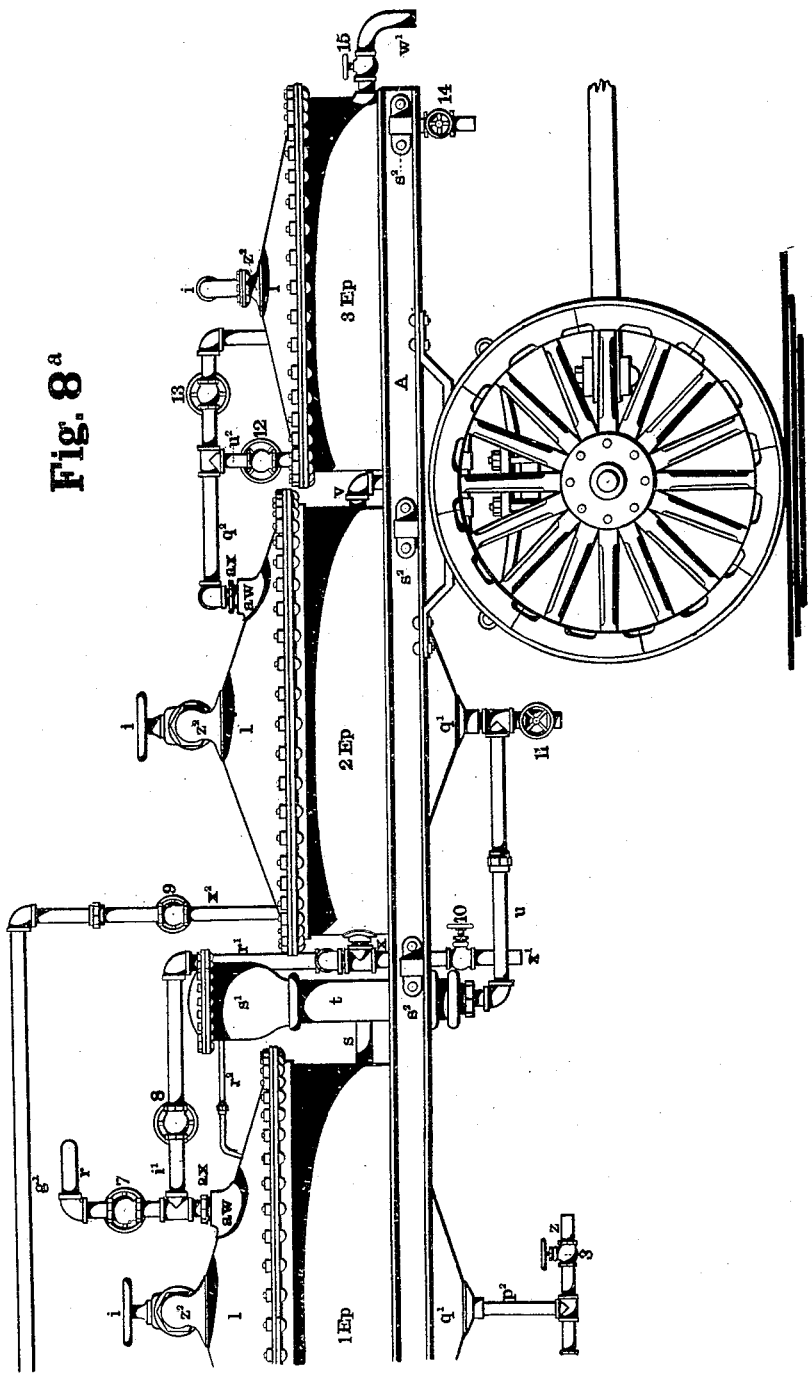

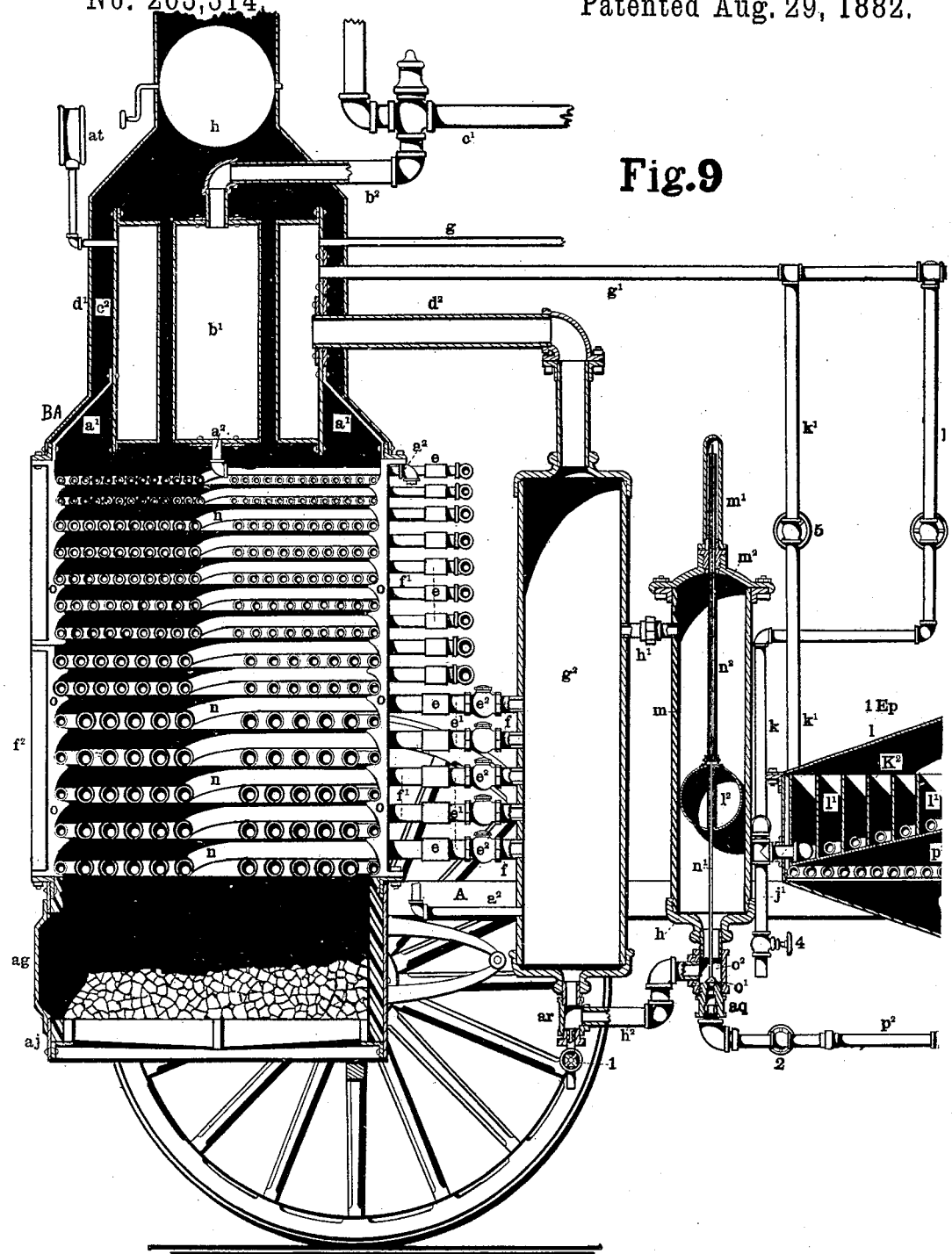

(No Model.) 15 Sheets—Sheet 11.
W. F. BROWNE.
PROCESS OF AND APPARATUS FOR THE MANUFACTURE OF SIRUP AND SUGAR.
No. 263,314. Patented Aug. 29, 1882.
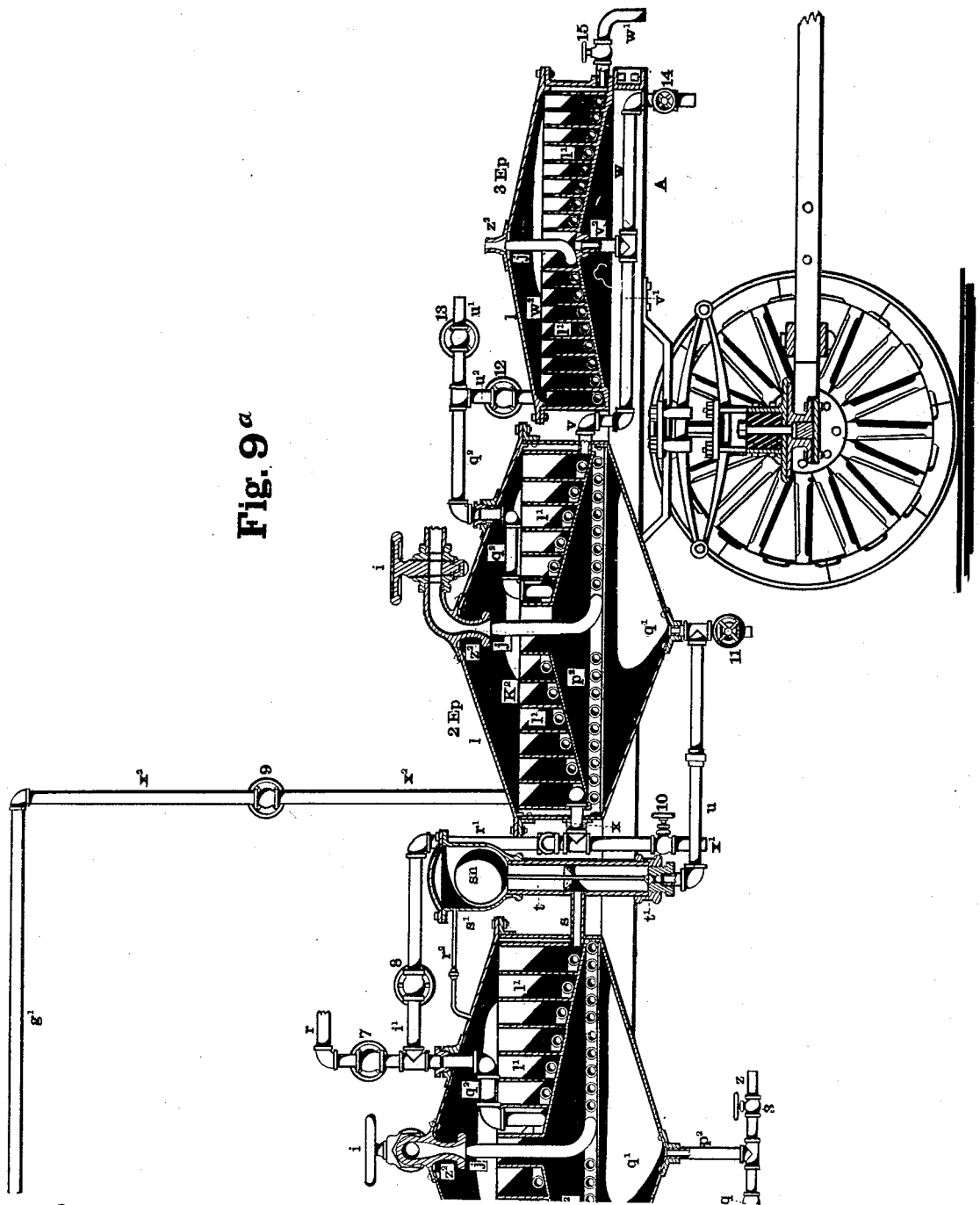
Fig. 9ª
Witnesses.
H. U. Higgins.
R. L. Higgins.
Inventor
Wm Frank Browne (No Model.)

W. F. BROWNE.

PROCESS OF AND APPARATUS FOR THE MANUFACTURE OF SIRUP AND SUGAR.

No. 263,314.

Patented Aug. 29, 1882.

15 Sheets—Sheet 12.

Witnesses.
H. U. Higgins.
R. L. Higgins.

Inventor
Wm. Frank Browne (No Model.) W. F. BROWNE. 15 Sheets—Sheet 13.

PROCESS OF AND APPARATUS FOR THE MANUFACTURE OF SIRUP AND SUGAR.

No. 263,314. Patented Aug. 29, 1882.

Witnesses.
H. U. Higgins.
R. L. Higgins.

Inventor
Wm Frank Browne (No Model.)    W. F. BROWNE.    15 Sheets—Sheet 14.
PROCESS OF AND APPARATUS FOR THE MANUFACTURE OF SIRUP AND SUGAR.
No. 263,314.    Patented Aug. 29, 1882.
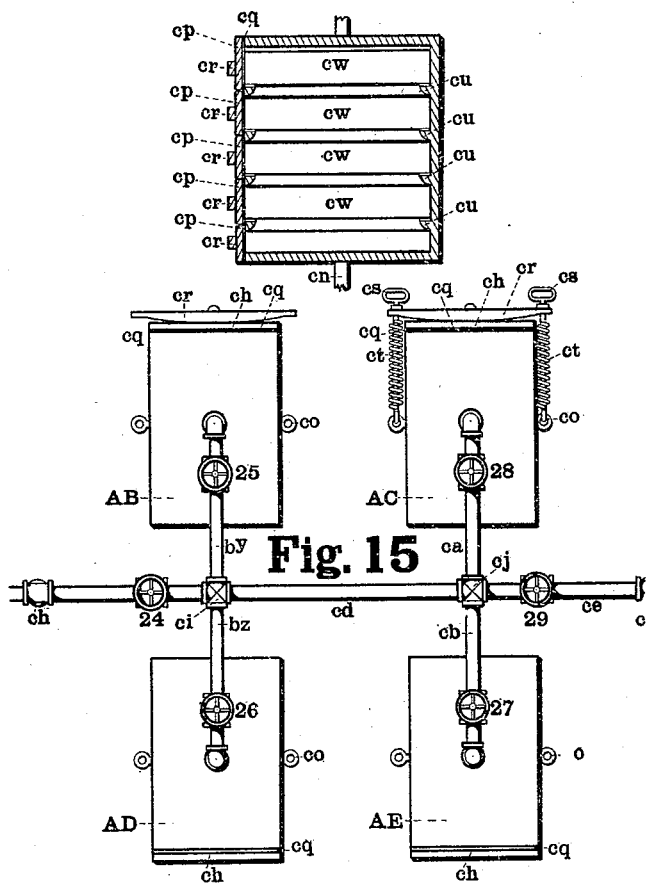
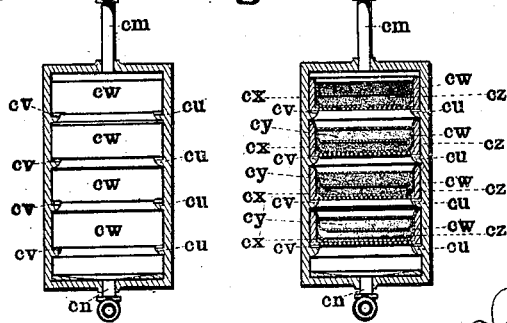

(No Model.) 15 Sheets—Sheet 15.
W. F. BROWNE.
PROCESS OF AND APPARATUS FOR THE MANUFACTURE OF SIRUP AND SUGAR.
No. 263,314. Patented Aug. 29, 1882.
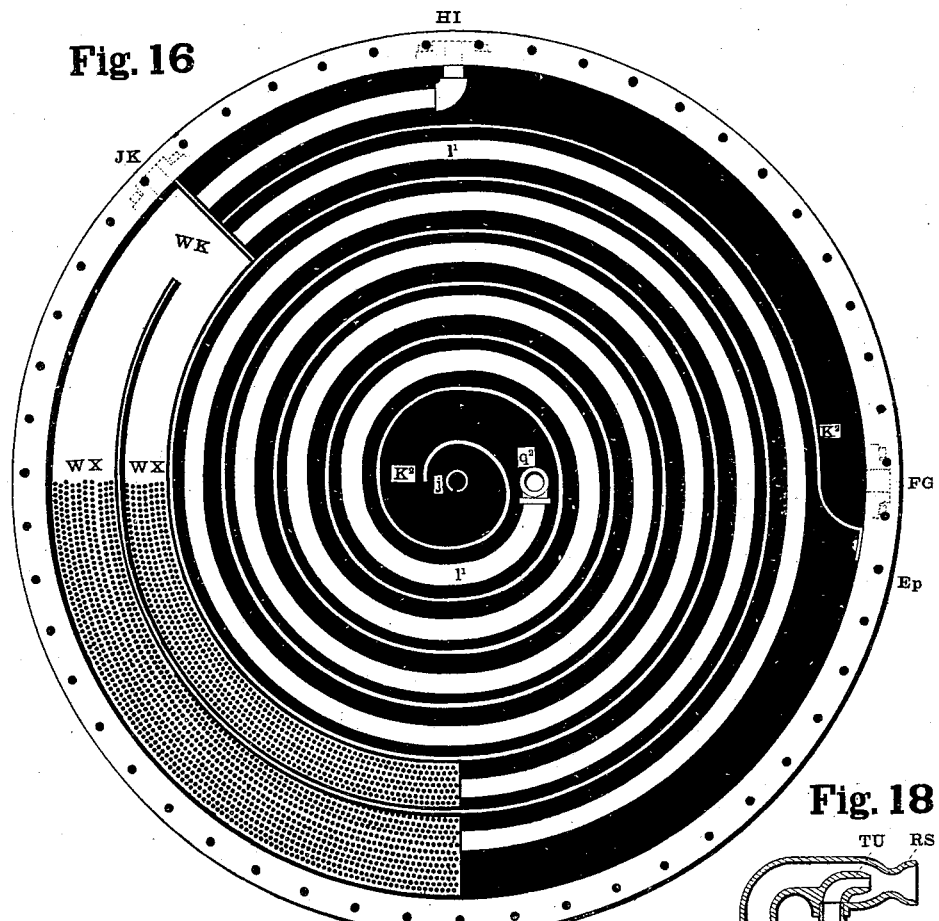
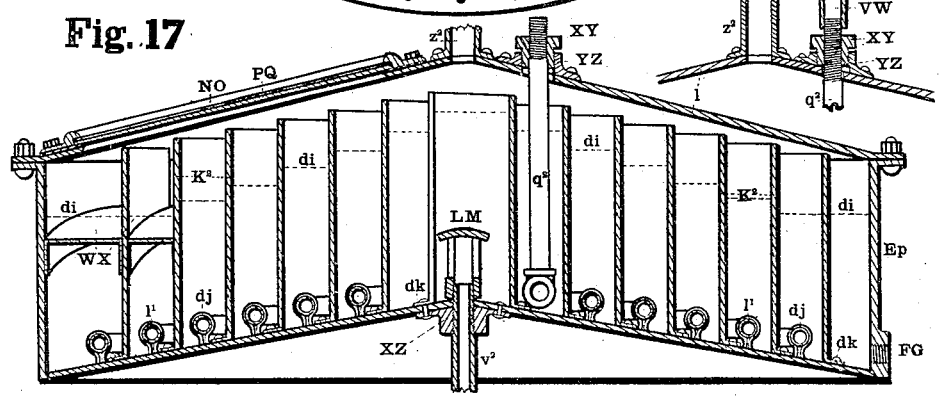
Witnesses.
H. W. Higgins.
R. L. Higgins.
Inventor
Wm Frank Browne

UNITED STATES PATENT OFFICE.

WILLIAM FRANK BROWNE, OF NEW YORK, N. Y.

PROCESS OF AND APPARATUS FOR THE MANUFACTURE OF SIRUP AND SUGAR.

SPECIFICATION forming part of Letters Patent No. 263,314, dated August 29, 1882.

Application filed June 23, 1881. (No model.)

*To all whom it may concern:*

Be it known that I, WILLIAM FRANK BROWNE, of the city, county, and State of New York, have invented certain new and useful Improvements in the Method and Process of Machinery and Apparatus for the Manufacture of Sirups and Sugar; and I do hereby declare the following to be a full and clear description thereof, reference being had to the accompanying illustrations, which form an essential feature of the hereinafter-described invention.

This invention relates to an improved method or process and the necessary works, which may be stationary or portable, for the manufacture of sirups and sugar from saccharine juices.

The invention consists, first, in the portable character of all the necessary machinery, apparatus, and appliances for the manufacture of sirups and sugar on the field or plantation where the sugar-cane grows; second, in the material, construction, and arrangement of portable rollers and motive power and their necessary adjuncts for the purpose of expressing the juice from the cane-stalks on the field or plantation where said cane has been grown; third, in the arrangement of a series of interchangeable strainers for straining and partially filtering the saccharine juices immediately after expressure from the cane-stalks; fourth, in the improvements in portable or stationary defecating tanks or receivers for defecating the saccharine juices immediately after leaving the strainers; fifth, in an interchangeable and continuous filtering device for filtering the defecated saccharine juices while being drawn or transferred from the defecating-tanks to an evaporating apparatus; sixth, in the process and means or apparatus for heating the defecated or defecated and filtered saccharine juices prior to the exit of said juices from said apparatus into a suitable receiver, where a requited amount of the aqueous liquid is eliminated from the said saccharine matter; seventh, in automatically discharging the semi-sirup or saccharine product from the receiver into an evaporating pan or pans; eighth, in the process and arrangement of suitable devices for conducting steam which has been eliminated from the saccharine juices through a suitable device or devices arranged in or about the evaporating pan or pans; ninth, in a combined evaporating pan and clarifier, or in an evaporating-pan which will evaporate and automatically clarify the saccharine juices and sirup; tenth, in a stationary or portable quintuple-effect evaporating apparatus for evaporating the aqueous liquid from saccharine juices; eleventh, in the process of heating the saccharine juices prior to the elimination of steam therefrom and discharging the heated saccharine juices into a separator, where a required amount of the aqueous liquid is evolved into steam, while the saccharine matter and the aqueous liquid which is required to be retained are discharged into a suitable evaporating pan or pans, device or devices, where the evaporation of the residual or remaining aqueous liquid is continued by means of suitable heating devices arranged in or about said evaporating device or devices; twelfth, in a spiral-channeled evaporating pan or device, with a heating device arranged therein or about said spiral channel, and a means for automatically skimming the saccharine juices or sirups while passing or flowing through said spiral channel.

The objects of the improvements herein described are to economize in labor, transportation, and fuel, and to make a better grade or quality of sirup and sugar than has been done heretofore, and to save a great amount of saccharine matter which has always heretofore been lost, in consequence of the unavoidable delay in transporting the cane to the mills now in use, by fermentation within the stalk, and also after the juice is expressed therefrom.

In tropical countries, where the atmosphere is very moist and the heat is great, the cane-juice commences to deteriorate or ferment immediately after the stalk is cut, and unless it can be worked up immediately after cutting it will be unfit for the purpose of producing sugar. Sometimes the entire crop is lost from the above-named causes, and frequently one-half of the crop perishes for the want of available means to expedite and put the saccharine properties beyond the destructive influence of a heated and humid atmosphere. Now, to obviate the loss as above set forth, or at least seventy-five per cent. of it, the cane-juice must be expressed from the stalk and evaporated on or near the plantation where it grows, which can be effected and a higher grade of sirup produced and a greater percentage of crystallizable sugar obtained therefrom when done by the quintuple-effect portable sugar-works. These works are made compact and as light as possible, mounted upon wheels, and drawn from place to place as circumstances require. When a crop of cane comprises many acres the works can be moved about from point to point over said plantation, and the saccharine product extracted from the cane without loss from fermentation or from hauling the cane a too long distance from the place of cutting.

In order to produce or obtain the desirable results as above mentioned, the system or method, processes, and means heretofore employed have had to be improved in each and every step in the manufacture of sirup and sugar, and said means have had to be constructed and arranged in a manner whereby they are made portable.

The rollers for crushing the cane-stalks are made hollow and of cast-steel, and also the necessary adjuncts pertaining thereto are made of cast-steel and in such form that the parts will offer a maximum of resistance to a minimum amount of metal, and also the same may be said of the motive power and motor which drives the rollers.

The rollers belonging to this apparatus, and as shown in the drawings, are designed to express about seven thousand gallons of juice per working-day, and it is practicable to construct a set of rollers to express from two to three times this amount and still possess the portable feature, while on the other hand a set of rollers and the necessary adjuncts thereto as now constructed and used and of equal capacity would be entirely impracticable when considered in the light of portability. After the juice is expressed it runs through a series of strainers or filters; from thence into defecators. This apparatus is provided with three defecators, so that by the alternate actions the process of defecation will be constant while the cane-juice is being expressed, and also simultaneously with the process of evaporating the defecated juice. After the defecated juice leaves the defecators it may or may not run through a series of filters and clarifiers which are arranged in a set of alternate filtering and clarifying devices. These filtering devices can be employed in any number required, or of any required area, whereby the slow process of filtering and clarifying can be so proportioned that a sufficient quantity of clarified juice can be obtained to afford a constant supply for the evaporating apparatus.

The method, process, and means herein described and employed for evaporating saccharine juices differ greatly from other methods, processes, and means heretofore used. In the old method the juices and sirups are boiled or evaporated in open pans or kettles, or vacuum pans or cylinders placed over a fire, or by heated currents of air or products of combustion, or by means of steam, air, or hot water passing through suitable devices placed in contact with the substance to be evaporated. In all of these devices the saccharine juices are boiled until the aqueous liquid is evaporated away from the saccharine, and while this evaporation is in progress fresh supplies of juice are added thereto until the sirup nearly fills the pan. Therefore, in consequence of this method of evaporating the saccharine juices, the saccharine matter contained therein is subject to a continued heat, which tends to injure the product by carbonization or caramelization. The quality of the sirup and its tendency to crystallization depend greatly upon the condition of the cane-stalk, the heat, and humidity of the atmosphere. When the stalk is cut and allowed to remain exposed to the heat and moisture fermentation sets in and deteriorates the juice, which, after expressure therefrom, requires an alkaline substance to correct the acidity. As this alkaline substance cannot be evaporated away, it remains in the sirup, and by its caustic principle and the heat used for evaporation the sirup becomes blackened, and also the crystals derived therefrom. When the sugar-works or mill is located at a considerable distance from the plantation or plantations the cane-juice deteriorates or ferments while in transit, and, owing to accidents, bad roads, inclement weather, and other causes, it will have to lie upon the plantation or at the mill until it is unfit for use. In consequence of the above-enumerated defects the loss to the planter is great, and also in many instances to the manufacturer. Now, to obviate the above-described defects and losses, the system or method of making sugar must undergo a radical change, all of which is accomplished by the portable sugar-works.

The process and method herein adopted for evaporating saccharine juices differ from the old means and method above described in the following manner, to wit: the saccharine juice is forced, by a pump or other means, in a constant stream or streams, into a heating device, which is composed of a series of coiled pipes of any suitable shape or size. Said coils are so arranged that the juice will pass from one to another throughout the series, and finally discharge their contents from the ends of one, two, or more of said coils into a receiver or receivers of any suitable construction. The juice, after entering the coil or coils, never ceases to circulate while in transit through said coils, and not until it is discharged into said receiver. While the juice is passing through the coils it is becoming gradually heated until discharged therefrom, and a constant supply is being forced therein equal to the amount which is being simultaneously discharged therefrom. No separation or elimination of steam can take place within said coils. Therefore the saccharine juice must remain in a liquid state, although heated far above the degree of heat required to generate steam. Consequently the saccharine matter must remain in its occluded state until discharged into the receiver or receivers. In consequence of this occlusion the aqueous liquid will protect and keep the saccharine matter from carbonizing, even when submitted to a very high degree of heat.

In all of the old means or devices heretofore used for heating and evaporating saccharine juices the steam is made to pass away as rapidly as possible simultaneously with the heating of the juices, thus allowing the saccharine matter, which is of greater specific gravity than the aqueous, to descend to the bottom of the pan or device, and there receive and transmit the heat to expel the aqueous liquid above; hence the carbonization or caramelization of the sirup. But by the new process of heating a constantly flowing or moving current of saccharine juice through an inclosed channel or channels and under pressure no separation of the aqueous liquid or precipitation of the saccharine matter can take place until it is discharged into the receiver, separator, or expansion-chamber, and as there is no auxiliary heat applied to said receiver, carbonization cannot be effected at this stage of the operation, and also, as the juice is excluded from the air from the time it enters the defecating-tanks, no oxidation can take place. The juice should acquire in the heating device a sufficient degree of heat to expel or evolve from one-half to two-thirds of the aqueous liquid after being discharged into the receiver, separator, or expansion-chamber, and the residue which remains with the saccharine matter will be discharged from the separator, receiver, or expansion-chamber into a suitable evaporating device or devices, and be heated therein by suitable means, which may conduct steam previously eliminated from the heated saccharine juice in the receiver, separator, or expansion-chamber. This steam, after separation in said receiver or chamber, passes into a dome located in or about the heating device, after which it can be used to continue the evaporation of the residual aqueous liquid while circulating through a spiral channeled evaporating-pan or a series of pans, which may or can be vacuum or partial-vacuum pans, as circumstances require. Should the steam not be hot enough to complete the evaporation in the pans, it can be made to pass through a superheater within the furnace prior to entering the heating device in or around the evaporating pan or pans. Steam can be conducted from a steam-generator located near by or at a distance from the pans, which may be the case in stationary works. One important desideratum which can be effected by the means employed is in obtaining steam at a pressure sufficient to run the engine which drives the crushing-rollers, which can be done providing the heat does not effect the crystallization of the sirup. As the duration of the time that the juice is subjected to the extreme heat is so short, (not exceeding five minutes,) it is highly probable that the saccharine matter will not be affected the same as when subjected to long and constant boiling, as is done in the ordinary way. The quantity of steam eliminated from the saccharine juice is more than sufficient to run the engine for crushing the cane. The means employed are sufficient to produce the result, and will be successful providing the saccharine matter is not injured, which, by the occlusion, will pass through the heater without carbonizing.

The exhaust-steam from the engine can be utilized to heat the defecating juice, and also to continue the evaporation in the pans; but if not hot enough to be made available for that purpose it can be made to pass through a superheater prior to its entering the heating devices in or about the evaporating-pans.

The pump can be run by the steam eliminated from the saccharine juices. In case the motive power for crushing the cane can be derived from the aqueous fluid within the saccharine juice great economy will be effected.

The most important feature in connection with the evaporating apparatus is the process of forcing the saccharine juice continuously, while under pressure, through a suitable heating device, wherein no evaporation or elimination of steam or any expansion of the aqueous liquid in the saccharine juices can occur until said saccharine juice is ejected or discharged from said heating device into a suitable separator, receiver, or expansion-chamber, after which the expansion and elimination of steam are effected by virtue of the high degree of heat imparted thereto while passing through said heating device.

Figure 2:
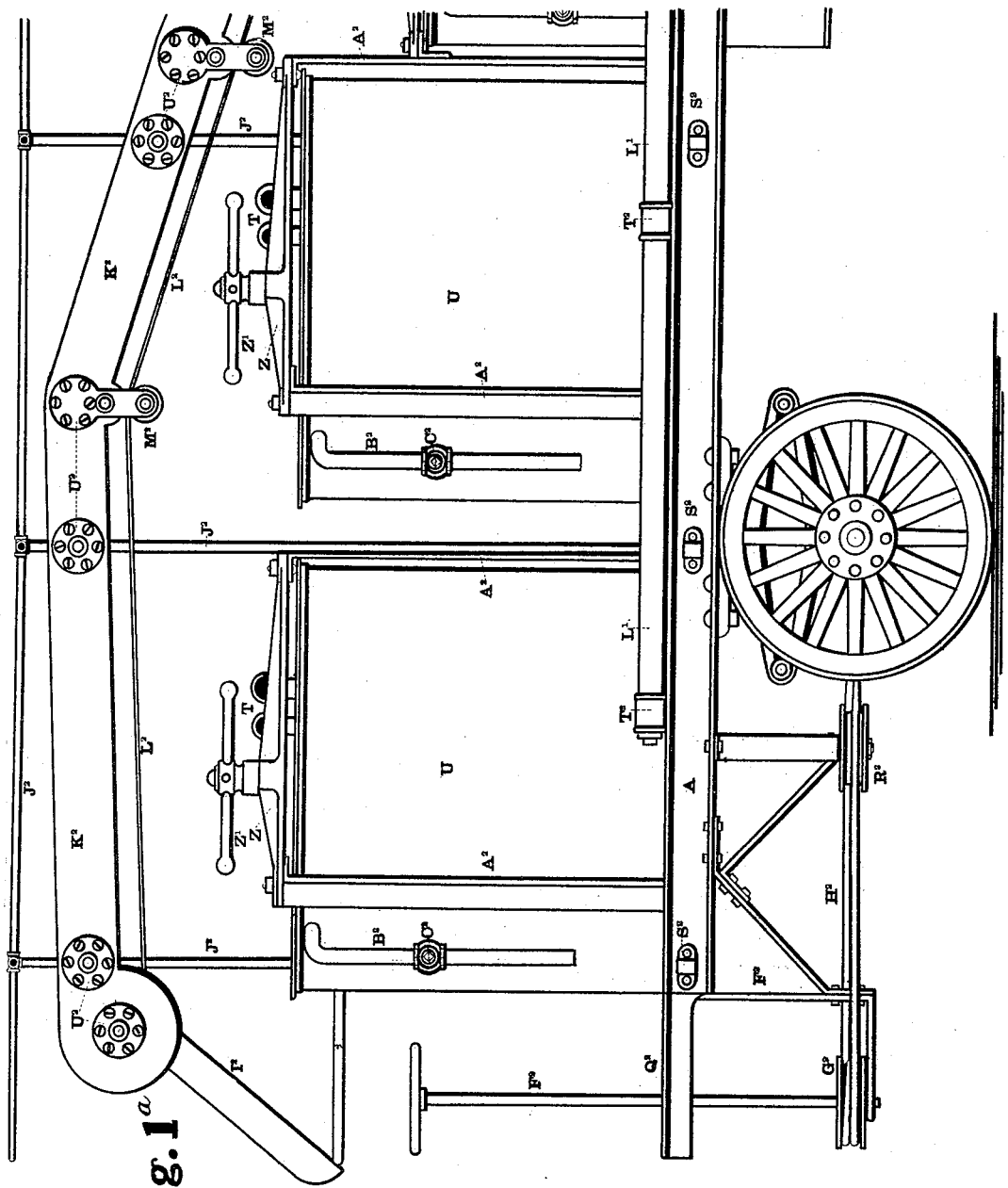
Figure 3:
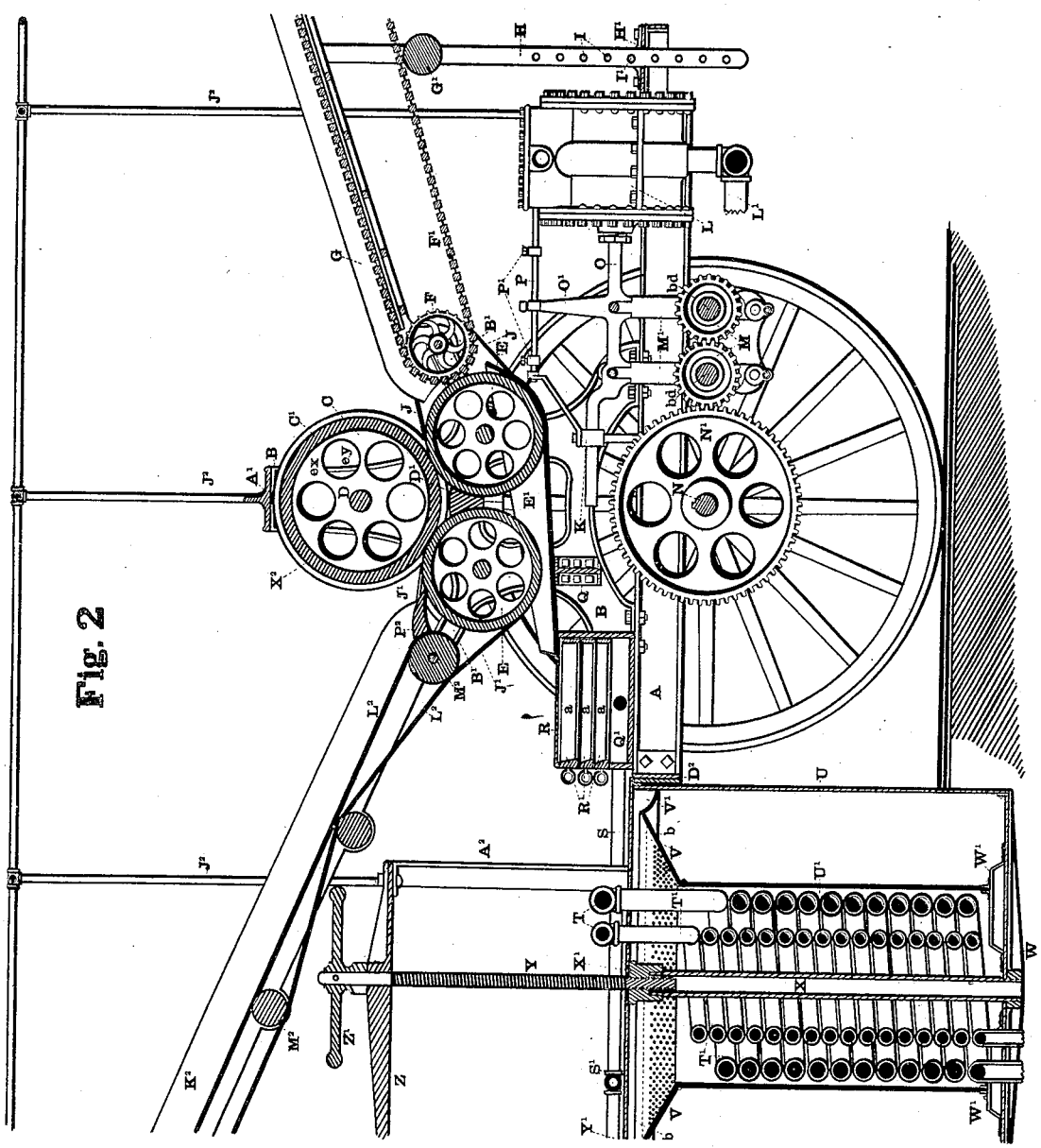
Figure 4:
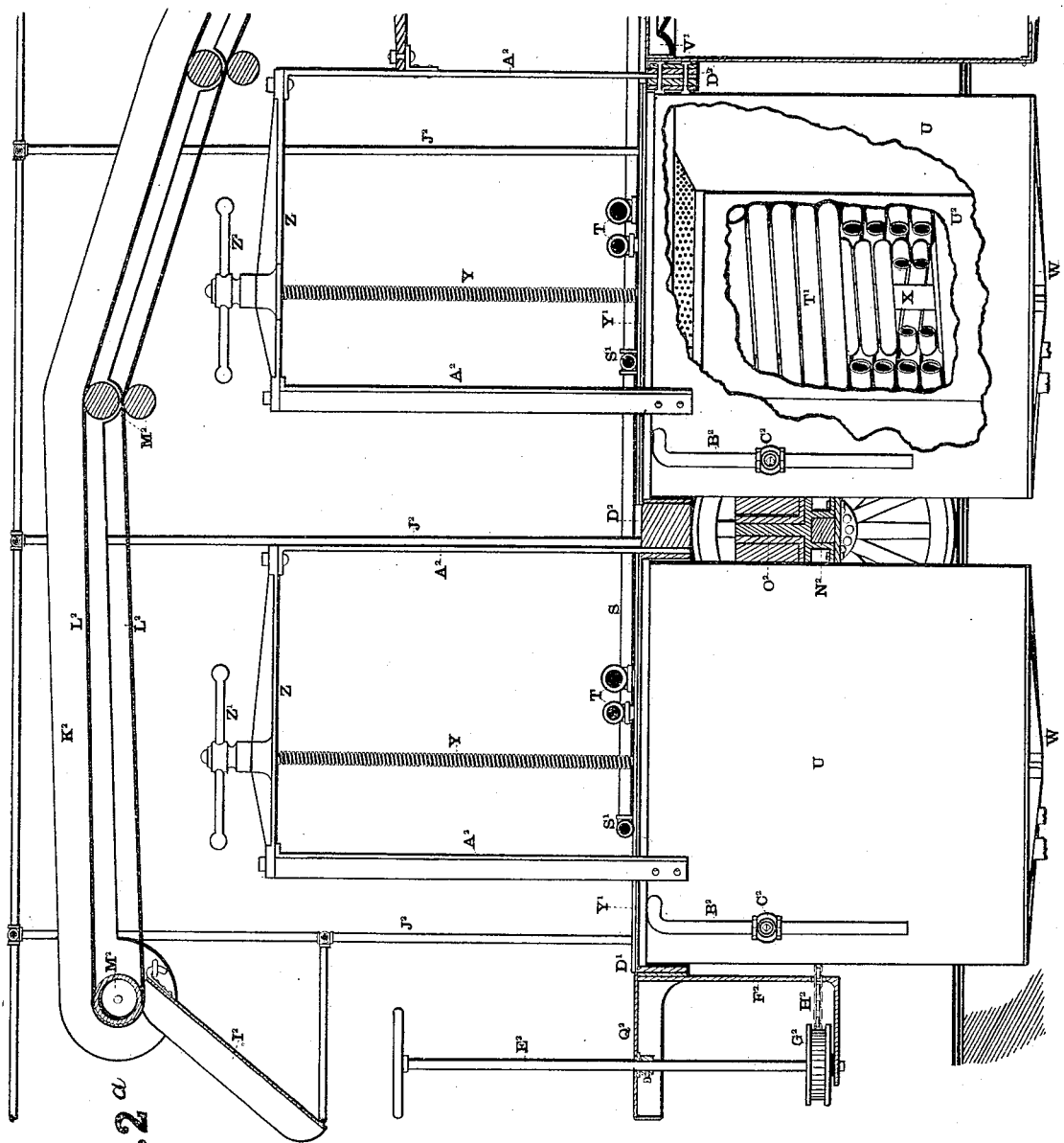
Figure 5:
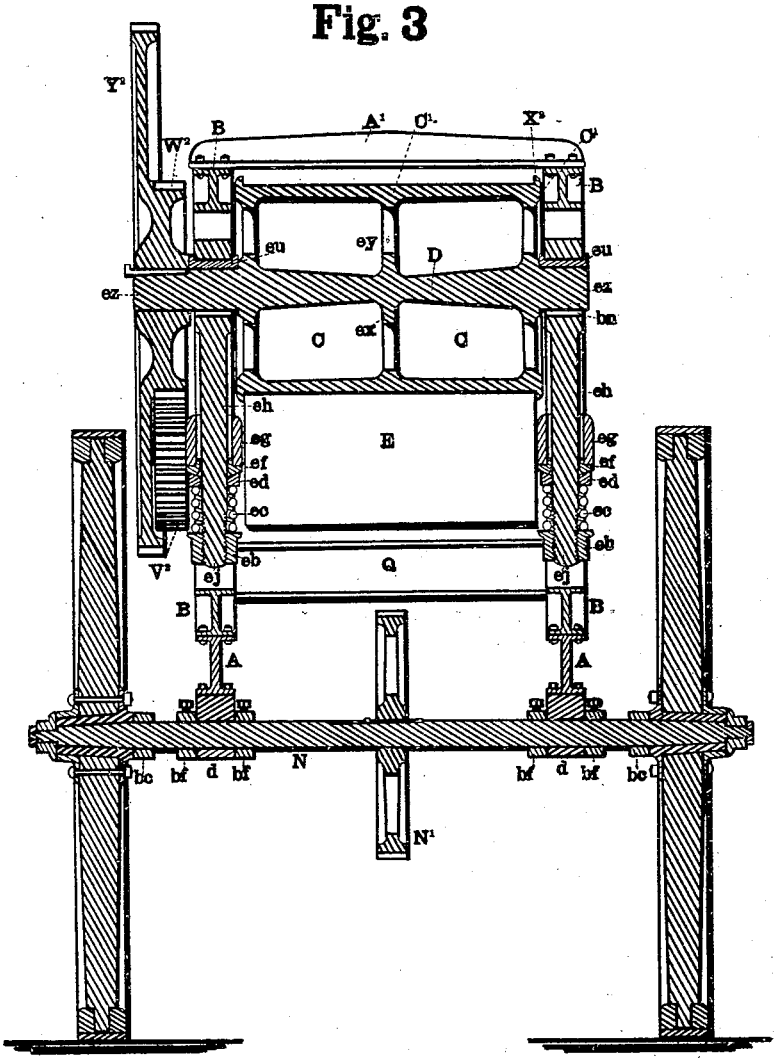
Figure 6:
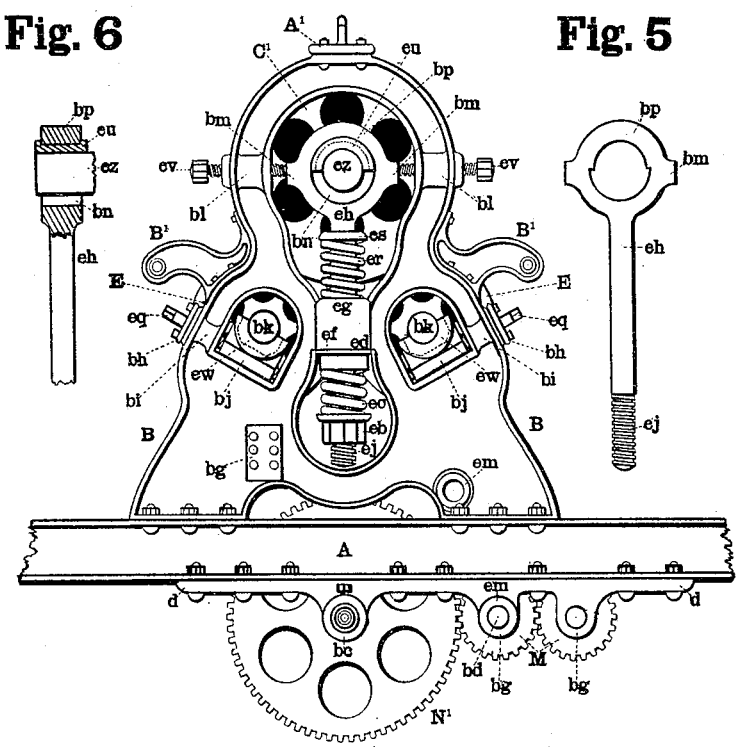
Figure 7:
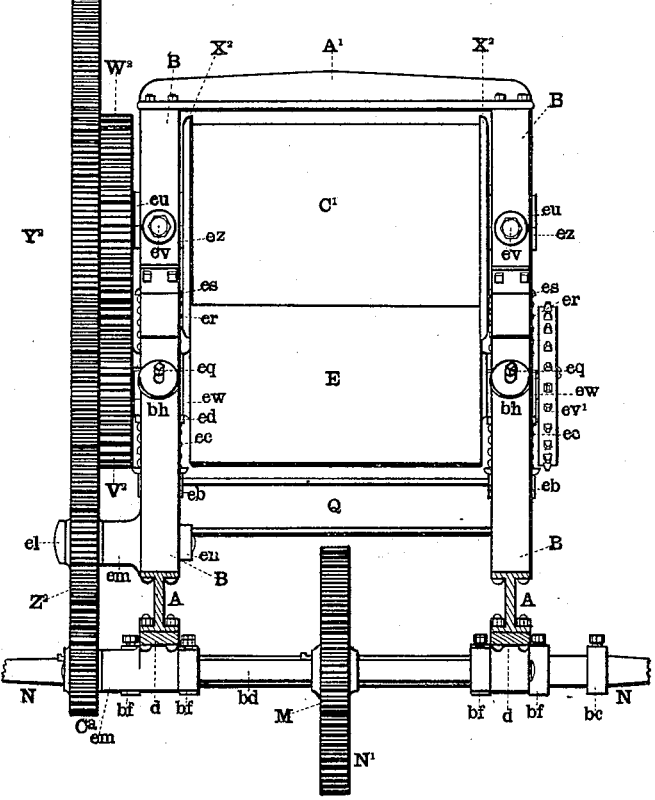
Figure 8:
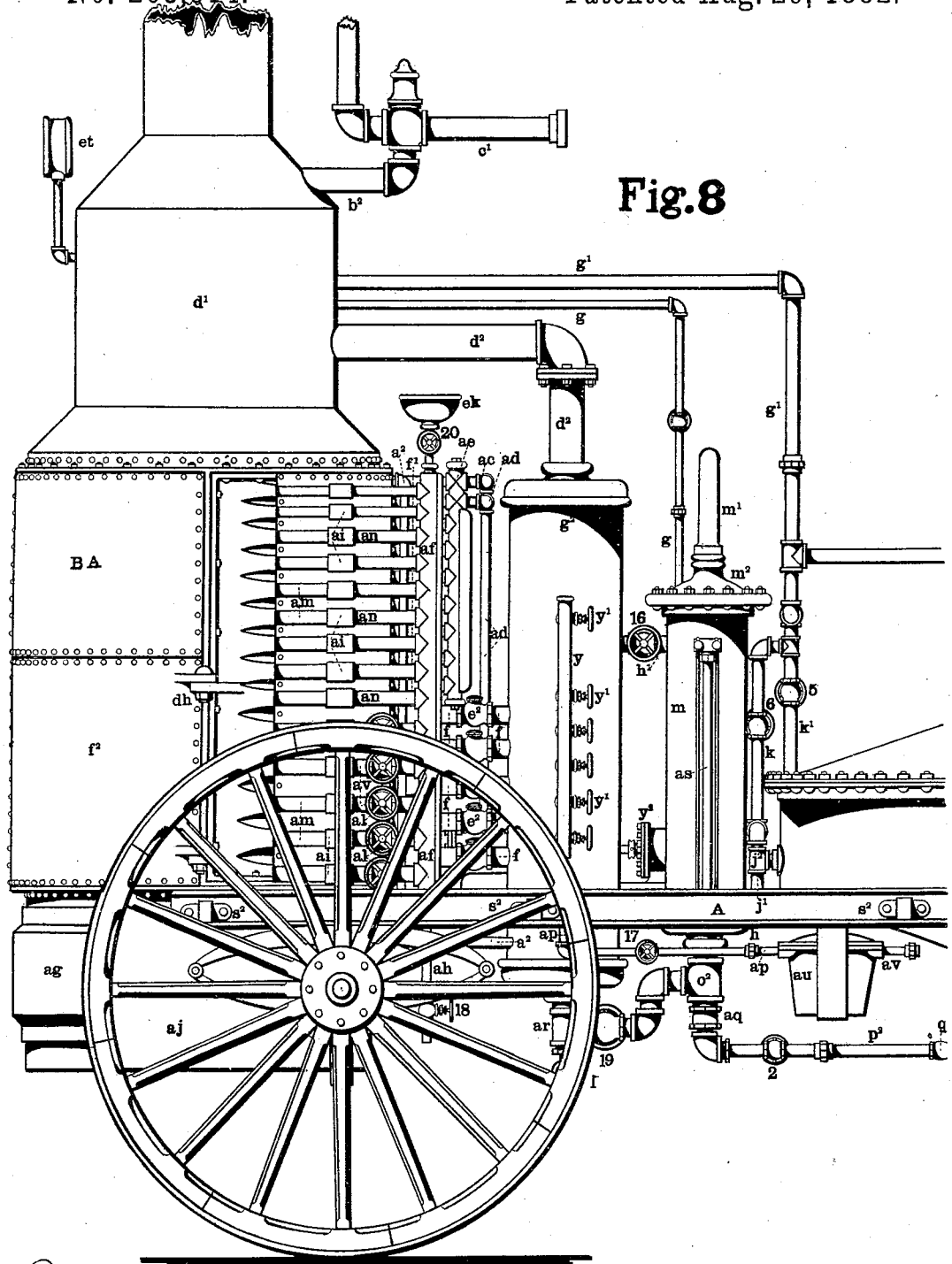
Figure 10:
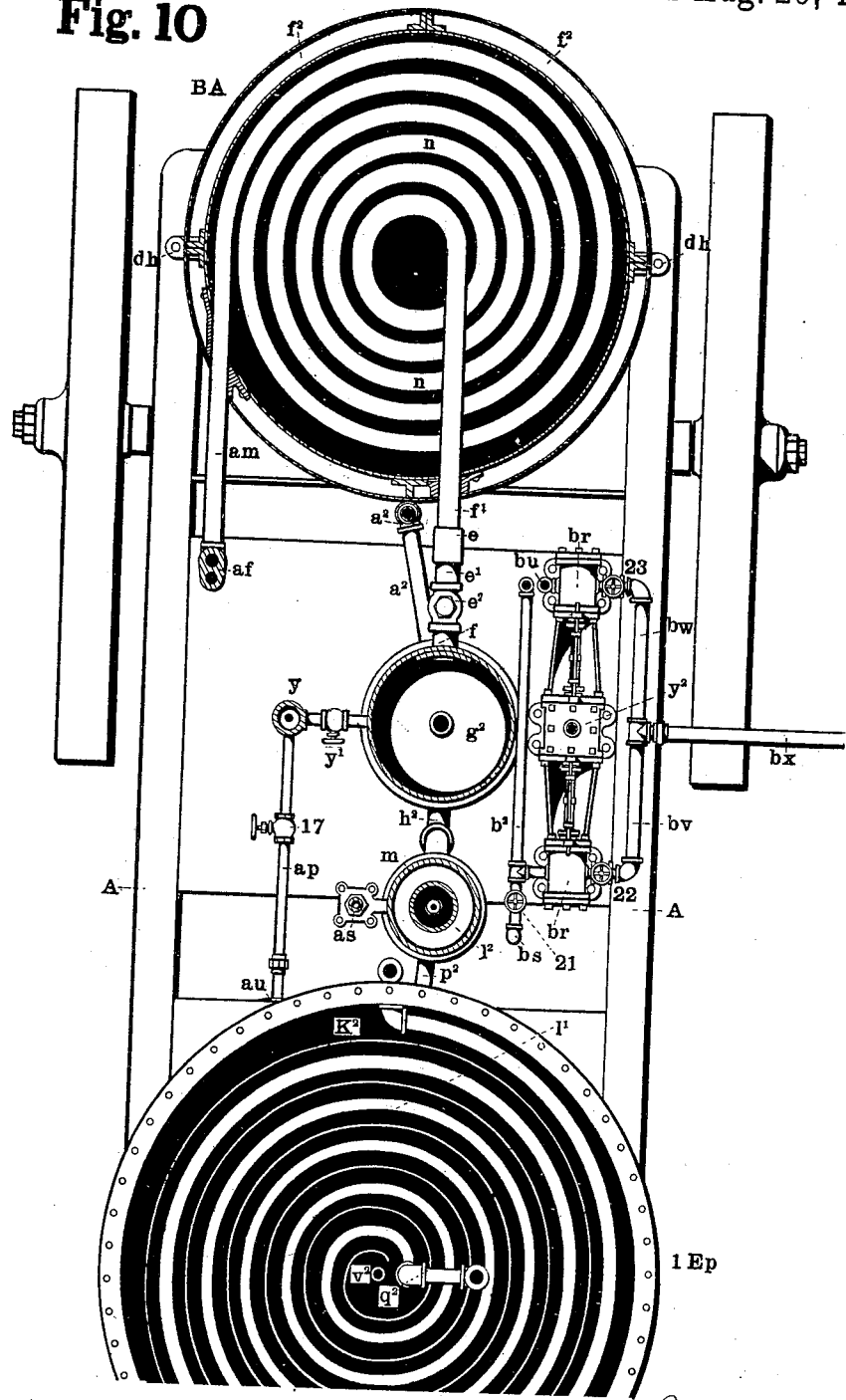
Figure 11:
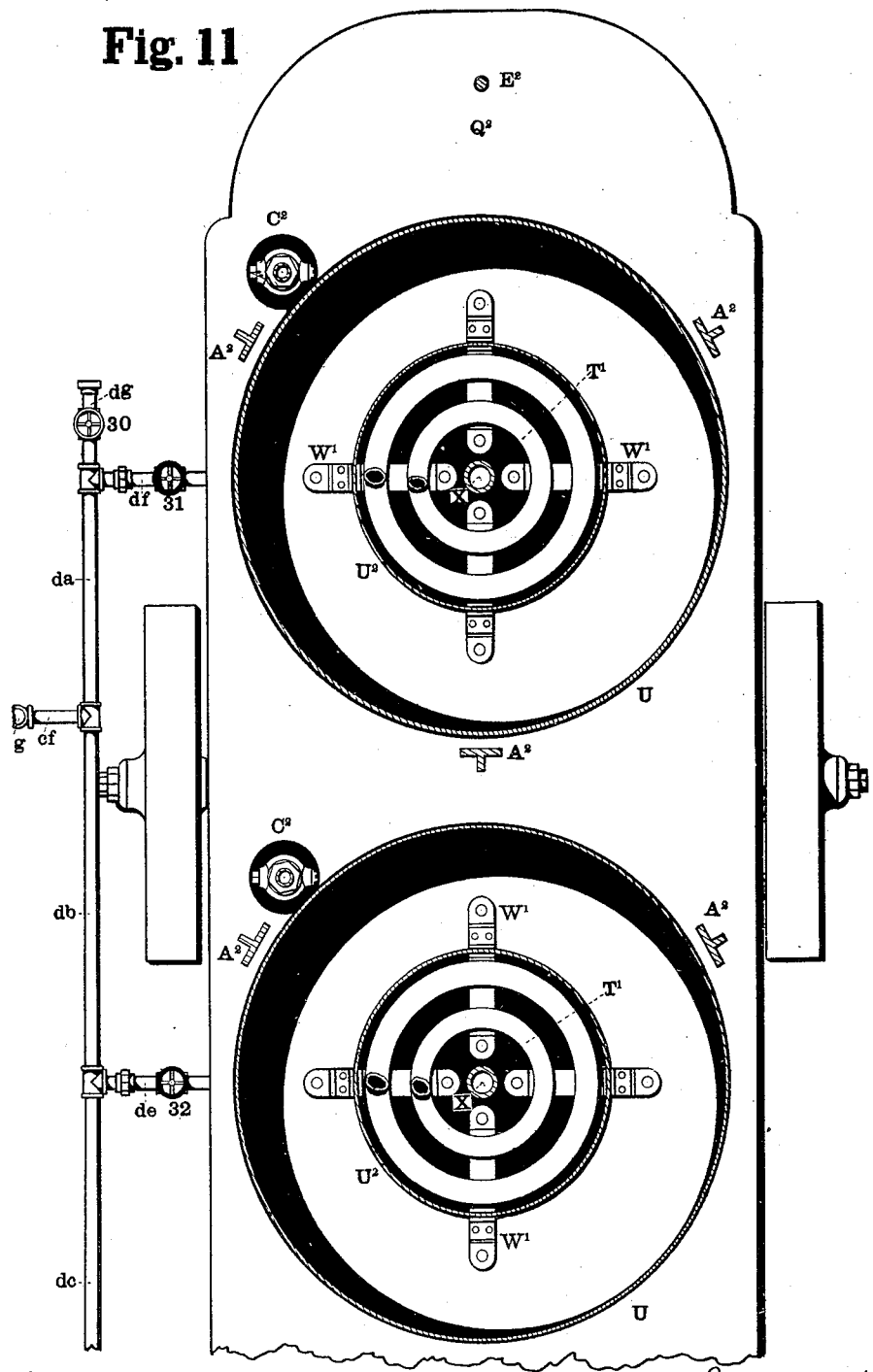

Figures 1 and 1$^a$ represent a side elevation of a set of rollers for crushing sugar-cane, the motor for driving said rollers, and tanks for defecating the juice expressed from said cane, all of which are mounted on wheels for the purpose of being drawn from place to place. Figs. 2 and 2$^a$ represent a vertical longitudinal section of Figs. 1 and 1$^a$, showing the internal construction of the rollers and defecating-tanks. Fig. 3 is a longitudinal section taken on a plane passing through the king-roller wheel and supporting-frame. Fig. 4 is an end elevation of the crushing-rollers and frame. Figs. 5 and 6 are views representing the connecting tensile pressure-bars which connect the journals of the king-roller with the adjustable pressure-nut. Fig. 7 is a side elevation of the crushing-rolls, showing the gear-connection between the main driving-shaft and the king-rollers. Figs. 8 and 8$^a$ represent a side elevation of an apparatus for evaporating saccharine juices. Figs. 9 and 9$^a$ represent a vertical longitudinal section, showing the internal parts of the view shown in Fig. 8. Figs. 10 and 11 are horizontal broken sections, showing the defecating-tanks and their connection with the evaporating apparatus. Figs. 12, 13, and 14 are sectional views, showing the internal arrangements of a filtering and clarifying device interposed between the defecators and evaporating apparatus. Fig. 15 represents views showing an interchangeable filtering and clarifying device. Fig. 16 is a plan view of an evaporating-pan with the cover removed, showing the arrangement of a spiral channel, coil, and an automatic skimming device. Fig. 17 is a central vertical section of the same. Fig. 18 is a sectional view of a device for blowing off the steam from the evaporating-pan.

Like letters and figures of reference denote corresponding parts in all of the illustrations.

A in Figs. 1 1ª and 2 2ª are the sides of a carriage or frame-work mounted upon wheels. The sides of this frame should be made of iron, and also the cross or connecting bars, although other material can be used.

B is the frame supporting the crushing-rollers. This frame is made very light and from cast-steel. The two ends are a duplicate of each other. Their bottoms or feet are planed or made true and bolted to the planed surface of the top flanges of the sides A. The crossbar Q, Fig. 7, at the bottom of the frame strengthens it, and also the cross-bar A' at the top. X², Fig. 3, are flanges on the ends of the king-roller C', for the purpose of extending over and covering the edges of the two lower rolls, E, at the point of contact, whereby the cane-stalks are kept from pressing off the ends of said rollers. These rollers are made hollow, as shown by the shell C' and the open space C.

$e\, x$ is a web or brace, and $e\, y$ holes therein. This web is for the purpose of strengthening the shell C'.

D is a shaft running through the central opening, C, and, with journals $e\, z$, extending through the roller. These rollers, shaft, and journals are all made in one piece from cast-steel.

D', Fig. 2, is a bar placed between the rollers to keep the crushed cane from dropping between the lower rollers onto the sluice or apron E', which conducts the cane-juice into the straining device R, which is provided with a series of interchangeable strainers, R'.

$a$ is wire-gauze or any other suitable material, through which the juice is strained.

Q' is a compartment for receiving the strained juice, and S is a pipe for conducting said juice away.

B' B', Figs. 2 and 4, are brackets or arms cast with or bolted to opposite sides of the frame B, and are for the purpose of supporting the rollers and wheels M² and F, which drive the cane-carrier F' and bagasse-carrier L². The cane-carrier is made adjustable by means of standards H, the upper ends of which are pivoted to the sides of the carrier-frame G, while the lower end is provided with holes I, pin I', and sill H'.

G' is a roller supported by the standard H, and is for the purpose of supporting the slack or under side of the cane-carrier belt F'.

J J' are belts or chains for driving the cane and bagasse carriers F' and L². These belts are driven by wheels or pulleys $e\, v'$, which are secured to the ends of the journals on the two lower rollers, as seen in rear elevation, Fig. 7.

M² M² represent the friction and supporting rollers over and around which the belt L² moves.

K² are the sides of a frame for supporting the rollers and preventing the bagasse from working off over the side of the carrier. I² is a shuttle for projecting the bagasse beyond the apparatus. The frame K² is supported by standards J².

U² are journal-bearings for the rollers M², secured to the sides of the frame K². Motion is given to the rollers and carriers by the engine L.

O is the piston, and O' the tappet-bar, which operates the valves by means of the rod P and tappet P'. One end of the piston is supported by the bearing K. This piston is provided with two slots, which embrace the pins which are connected to two vertical levers, M'. These levers rotate about the shafts $b\, d$. Their lower ends are provided with pawls which work a ratchet-wheel of the same diameter as the pitch-line on the toothed wheels M. These wheels are made to revolve by the motion of the piston, and transmit the power of the engine to the wheel N', which is splined to the axle N. Thus it will be observed that the wheels can be revolved by the motor L and made to carry the apparatus over ordinary roads or about plantations, although when steam is not available the apparatus can be drawn by animal power when expedient; and, also, when the ground is too soft to support the apparatus, broad shoes of suitable material can be placed beneath the wheels, after which the apparatus can be drawn to the point desired when sufficient power is applied. The gear-wheel N' or the pinion which works into it should be made to work in and out of contact with each other as circumstances require.

Motion is given to the king-wheel Y² and roller C' by means of the pinion C³ on shaft $b\, d$ and an intermediate wheel, Z². This intermediate wheel is held in position by the boss $e\, m$, which is cast with the frame B and pin or bolt $e\, l$ and nut $e\, n$, as shown in Figs. 1 and 2.

The two lower rollers, E, are driven by the wheel W, working into the two wheels or pinions V². The diameters of the pitch-line of these wheels coincide with the diameters of the three rollers, in consequence of which their surface movement is the same.

$e\, v$ in Figs. 4 and 7 are bolts for regulating or varying the lateral distance between the top or king roller and the two bed-rollers. By this means the space between the king and bed roller next to the cane-carrier can be increased to suit the condition of the cane-stalks, which may vary in size and hardness in different climates. The distance between the king and bed roller next to the bagasse-carrier is diminished in a ratio corresponding to the increase on the opposite side. Consequently by this arrangement any desired impingement can be brought to bear upon the last contact on the cane. The vertical adjustment of the king-roller is obtained by the tensile rods or bars *e h*, which are provided with screw-threads *e j* on their lower ends and heads *b p* on their upper ends. These heads are provided with openings, as seen in Fig. 5, and projections *b m*, against which the regulating-screws *e v* impinge. The faces of these projections are made broad enough to insure contact with the adjusting-screws during any vertical adjustment of the king-roller, which is done by turning the nuts *e b* and bringing the bearings *e u* upon the journals *e z*. The tensile bars *e h* pass through the bosses *e g*, which are cast with the frame B. Into the lower end of the boss a guide-bearing, *e f*, is fitted, the lower face of which is made convex. To this surface a concave bearing, *e d*, fits, and moves thereon when a lateral movement is given to the king-roller. Between the concave bearings and the nuts *e b* the springs *e c* are placed, for the purpose of yielding and allowing the king-roller to rise when a substance too hard to be crushed is introduced by accident or otherwise. The springs *e r*, inserted between the collars *e s* and bosses *e g*, may be employed to elevate the king-roller when the pressure is relieved by the nut *e j*, thus keeping the rollers apart while being transported from place to place. If the spring should not be used for this purpose, it would be a good plan to insert some substance like sheet-rubber between the rolls while in transit, thus preventing the concussion of the rollers.

*b n* represent an open space beneath the journals *e z*, which can be filled with a wooden bearing or block and taken out when the bearing *e u* is to be replaced. This bearing is provided with suitable end flanges, which prevent any lateral movement, and also it can be made from any suitable metal.

*b l* are bosses cast to the frame B, through which the adjusting-screws are turned.

*b k* are two journals projecting from the bed-rollers E, and rest in the bearings *e w*. These bearings rest in sliding devices *b j*, and are caused to be moved by the screw *e q*. This screw is provided with a collar, which is covered by the cap *b h*, thus allowing said screw to turn without an advancing or receding movement, and when turned to cause the two rollers E to be brought into alignment with each other. *b i* are bosses cast to the frame to give additional strength.

*b g* is a re-enforcement cast upon the outside of the frame B, and is for the purpose of giving additional strength at the point where the cross-bar Q is connected.

*b f* are collars for adjusting to the bearings *d*, in which the axle N revolves.

*b c* are collars against which the wheels turn.

*d* are pieces of metal, cast or otherwise formed with projections, to receive the axle N and the shafts *b d*. They should be fitted with planed joints to the under side of the flanges on the sides of the frame A.

U in Figs. 1 1$^a$ and 2 2$^a$ represents three tanks for defecating saccharine juices. These tanks are mounted on wheels, and are in position to be moved from place to place.

A$^2$ are standards secured to the frame-work, and inclose the tanks. These standards rise above the top of the tanks, and are connected by a triangular supporting device, Z, at their top ends. At the center of this device Z a hub is formed over the center of the tanks. Through this hub the end of the screw-shaft projects. To this end the handle Z' is attached. The lower end of this screw terminates in a nut, (seen in sectional view, Fig. 2.) This nut is secured to a pipe, X, which is screwed into a hub which forms the center of the radiating arms W on the bottom of the tanks. This device is for the purpose of elevating the tanks in the position shown in Fig. 1, ready for removal, and to lower the tanks when wanted for use, as shown in Fig. 2.

U' is a cylinder resting upon brackets or supports W', which are secured to the bottom of the tank U. The top of the cylinder is provided with a perforated rim, V, which inclines upward to about three-fourths of its width, and then curves downward and terminates in a band, which extends to the top edge of the tank U, or thereabout. Thus an annular recess, V', is formed.

T' represents two helical coils located within the cylinder U'. The outlet of the coils is at the bottom, and the inlet for the steam is at the L-fittings T at the top of the tank. These fittings are connected to a fitting, T$^2$, on the exhaust-pipe L' by suitable flexible pipe-connections, which are provided with suitable valves for regulating and cutting off the flow of steam in the coils T'.

B$^2$ is an overflow-pipe leading from the recess V', and is for the purpose of carrying off the scum which rises on the surface of the saccharine juices in the tank. The stop-cock C' is to be closed when the scum does not overflow.

S$^2$ are sockets secured to the sides of the frame A, the object being to support a skeleton frame, J, which can be covered with canvas to protect the machinery and apparatus from inclement weather.

N$^2$ is the forward axle, and O$^2$ the king-bolt passing through the rocker.

Q$^2$ is a platform for a man to stand upon to steer the apparatus by the steering device F$^2$, G$^2$, H$^2$, and R$^2$ when driven by steam.

In Figs. 8 8$^a$ and 9 9$^a$, B A represent an external and a vertical sectional views of a heating apparatus for heating defecated saccharine juices above the heat required for generating steam prior to the discharge of said juices from said heating apparatus, which is constructed of suitable coils, *n*, of pipe, and of any desired number. The coils herein shown are spiral, and coiled in horizontal planes, and arranged one above another, and are supported by suitable projections or lugs, *o*, secured to the interior of the case or shell. The ends $a\,m$ and $f'$ project parallel to each other through the case, as shown in horizontal section, Fig. 10. The ends $a\,m$ of the coils are connected to a circulating stand-pipe, $a\,f$, while the ends $f'$, with the exception of the two upper ones, are connected to the circulating stand-pipe $a\,e$ and the separator $g^2$ by means of the right-and-left couplings $a\,i$ and $e$, nipples $a\,n$, and close nipples $a\,v$, $f$, and $e'$, and also globe-valves $a\,l$ and check-valves $e^2$. The five lower coils are provided with the check-valves $e^2$ and globe-valves $a\,l$, which are employed to check the flow of the juice into a coil or a return of the juice or semi-sirup into the coils from the separator $g^2$ whenever one of the coils should become worn away by the action of the heat. When a case of this kind does occur the right-and-left couplings $a\,l$ and $e$ can be removed, the doors $f^2$ opened, and the defective coil taken out and replaced by a duplicate and connected, after which turn the globe-valve $a\,l$, and the circulation will be completed. All of the coils can be provided with these valves; but, as the heat is not sufficient to injure the coils above the fifth one, it is not necessary to introduce them.

$a\,d$ and $a\,c$ are the feed-connections, which consist of fittings, and two pipes which connect with a steam-pump, which is provided with two water-cylinders, $b\,r$, and a steam-cylinder, $y^2$, as seen in Fig. 10.

The circulating stand-pipes $a\,f$ and $a\,e$ are divided up into separate compartments or passages for the purpose of keeping the two streams apart until they are discharged into the separator $g^2$, where they unite. The stream which separates therefrom flows through pipe $d^2$ into the dome $b'$, from whence it is taken through pipes $g$, $g'$, and $c'$. The condensed steam returns to the separator $g^2$ through the pipe $a^2$. $a'$ are supporting-braces, which support the dome from the top flange of the case or shell. $c^2$ is a flue-space between the dome and shell $d'$. $a\,t$ is the pressure-gage to indicate the pressure within the heating apparatus. $a\,g$ is the furnace-door, and $a\,j$ the furnace.

$a\,r$ is a T-fitting, connected by a close nipple to the bottom of the separator $g^2$.

$h^2$ is a nipple, forming a connection between the separator $g^2$ and the stand-pipe $m$ by means of T-fitting $o^2$ and a close nipple which joins the cap or head $h$. To the run of the fitting $o^2$ a fitting, $a\,q$, is screwed. The upper side of the fitting is provided with a valve-seat and valve $o'$ thereon. To this valve the rod $n'$ is attached and passes through the float $l^2$, which causes the valve to rise and fall in accordance with the height of the saccharine matter within the pipe $m$.

$m^2$ is a cap covering the said pipe $m$.

$m'$ is a shield for the purpose of protecting the rod $n'$ and tube $n^2$.

$h'$ is a pipe connecting the separator $g^2$ to the stand-pipe $m$, for the purpose of equalizing the pressure and allowing the float to act freely.

$p^2$ is a pipe, $q$ a check-valve, and 2 a globe-valve forming a connection between the stand-pipe $m$ and evaporating-pan 1 $E^p$, which has an inverted conical bottom, $q'$, and also evaporating-pans 2 $E^p$.

$p^2$ is a spiral coil for heating saccharine juices or semi-sirups. The steam which flows through this coil is conducted thereto from the dome through pipes $g'$ and $k'$. The exhaust is through the nozzle $j$ into an ejector, $z^2$. This ejector is provided with a plug-cock, $i$, which is closed when the pans are to be cleaned by steam.

$K^2$ represents the partition-plate, which forms a spiral channel from the center to the circumference of the pans. These divisions should be about three inches apart, and the bottom of the channel should incline enough to cause the juices, semi-sirup, or sirup to flow and discharge itself in a ratio equal to the supply. As the supply may vary somewhat, a valve can be fixed on the discharge-pipe $s$ and be made to control the discharge in accordance with said supply.

$l'$ are spiral coils placed in the spiral channels, a plan of which is shown in Fig. 16. The object of the coil is to heat the flowing saccharine juices, semi-sirup, or sirup as it flows down the inclined spiral channel. The steam for this coil is conducted from the dome or other place or places through the pipes $g'$ and $k$. The nipple $j'$ and valve 4 are for draining the coil and upper pipes.

$l$ are covers for the pans, and they are provided with flanges and are bolted tightly to the flanges on the evaporating-pans. A glass is inserted in these covers, as shown in sectional view at N O and P Q, Fig. 17. By means of these covers $l$ a vacuum or partial vacuum is formed by the steam-jet, or it can be done by a vacuum-pump.

The outlet or exhaust for the coil $l'$ is through the pipes $q^2$ and $r$; or by closing valve 7 and opening valve 8 the steam will pass through pipe $i'\,r'$ and nipple $x$ into the coil $l'$ in evaporating-pan 2 $E^p$. The steam now passes through this coil and is discharged through the pipe $q^2$ and $w'$; or by closing valve 13 the steam will pass through $u^2$ and valve 12 into coil $l'$ and be discharged from nozzle $j$ through ejector $z^2$ in pan 3 $E^p$.

The steam for coil $p^2$ in pan 2 $E^p$ is conducted through pipes $g'\,x^2$ and discharged from the nozzle $j$ into and from ejector $z^2$.

The saccharine juices or semi-sirup in pan 1 $E^p$ is discharged into stand-pipe $t$. The bottom of this pipe is provided with suitable fittings and with a valve-seat therein and valve $t'$ thereon. This valve is provided with a rod which connects it with the float $S^n$, so that when the saccharine matter raises the float the pressure in pan 1 $E^p$ will force it out into the bottom of pan 2 $E^p$ by the way of pipe $u$, where it rises and overflows into the spiral channel, and is discharged through the connection $v$ and through pipes $v'$ $v^2$ into pan 3 E$^p$, whence it flows down the spiral channel to the discharge-pipe $w'$.

$w$ is a pipe, and 14 a valve for draining the pipe $v'$ and spiral channel in pan 2 E$^p$. The bottom of this pan can be drained by opening valve 11. Pan 1 E$^p$ can be drained by opening valve 3. $r^2$ is a pipe connecting the pan with the head $s'$ of the stand-pipe $t$. This pipe is to equalize the pressure and allow the float and valve to work freely.

$a\,u$ in Fig. 8$^a$ represent a trap which is connected to a stand-pipe, $y$, by the pipe $a\,p$. The stand-pipe $y$ is connected to the separator $g^2$ by means of nipples and valves, as shown in Fig. 10 at $y'$, and they are for the purpose of controlling or regulating the amount of liquid substance in the separator, for with valve 19 closed the discharge will be at any one of the series of valves $y'$ which may be open, and thence through the stand-pipe $y$ and pipe $a\,p$ to the trap, where it will be discharged at any place required. The pipe $a\,v$ leading from the trap can be connected with pipe $p^2$ and discharge directly into the pan 1 E$^p$ without the use of stand-pipe $m$, and also the device $s'$ and $t$ can be dispensed with without departing from the principles of the invention, for the pressure transmitted through the trap will force the saccharine matter through all of the pans; and, furthermore, the pans can be located on planes one above the other, so that the saccharine matter will pass from one to another by the force of gravity.

In the broken plan and sectional view, Fig. 10, A represents the frame-work, mounted on wheels, and B A a horizontal section of a heating apparatus for heating defecated saccharine juices.

$n$ represents one of a series of heaters through which the juices pass.

$f^2$ are two doors, which swing upon hinges $d\,h$.

$a\,m$ and $f'$ are the two ends of the heater $n$, which are connected to a circulating stand-pipe, $a\,f$, and the separator $g^2$.

$e$ is a right-and-left coupling for connecting the heater with the nipple $e'$, check-valve $e^2$, and nipple $f$.

$a^2$ is a pipe leading from the dome to the bottom of the separator $g^2$.

$y'$, $y$, 17, $a\,p$, and $a\,u$ is a device which can be used to conduct the semi-sirup from the separator to the pan 1 E$^p$, as previously described.

$h^2$ is a pipe forming a connection between the separator $g^2$ and stand-pipe $m$.

$l^2$ is the float, which raises a valve to discharge the saccharine matter into the evaporating-pan 1 E$^p$ through the pipe $h^2$.

$K^2$ represents a spiral plate which forms a spiral channel, and $l'$ is a spiral coil therein.

$q^2$ is a pipe for conducting the steam therefrom.

$v^2$ represents the pipe which discharges the saccharine matter into the spiral channel.

$s$ is the outflow for the pan seen in Fig. 9$^a$.

$b^2$ and $b\,u$ are discharge-pipes leading from the two cylinders $b\,r$ to the induction-pipes, which connect with the upper coils in the heating apparatus B A.

$b\,w$ and $b\,v$ are the induction-pipes for conducting the defecated juices to the pumps, which are worked by the steam-cylinder $y^2$.

22 and 23 are valves for controlling the supply of the saccharine juices.

The valve 21 is to open and drain the upper pipes connecting with the upper coils through the waste-pipe $b\,s$.

Fig. 11 is the representation of a top plan of a portion of the carriage on which the tanks U for defecating saccharine juices are transported. Two of said tanks are shown in cross-section.

U$^2$ are cylinders which surround the coils T$'$.

W$'$ are supports for keeping the cylinder elevated above the bottom of the tank for the purpose of allowing a free circulation of the saccharine juice in and between the cylinder U$^2$ and tank U.

X are the pipes by which, in connection with the elevating-screws Y, the tanks are raised and lowered.

C$^2$ are stop-cocks and pipes which control the flow of the scum which rises to the surface of the defecating saccharine juices.

A$^2$ are cross-sections of standards, which are employed while raising the tanks.

Q$^2$ is the platform on which a person stands to steer the apparatus while in transit. E$^2$ is a part of the steering device.

$d\,e$ and $d\,f$ are pipes which are connected to the bottom of the tanks U and to the pipe $d\,a$, $d\,b$, and $d\,c$. These pipes are for the purpose of conducting the defecated saccharine juice to and through the main pipe $c\,f$, $c\,d$, $b\,x$ to the pumps $b\,r$ and thence to the heating apparatus B A; or by closing valve 24 and opening valves 25, 26, 27, and 28 the said juices will pass through the filtering and clarifying devices A B, A C, A D, and A E, and out at the bottom pipes, $c\,n$, to and through the pipe $b\,x$ to the pumps. Each one of the filtering and clarifying devices is provided with any desired number of filter-trays, $c\,w$, four of which are shown in the sectional views. Each one of these trays contains filtering or clarifying material. In this case the coarse filtering material should be placed in the top tray, and the degree of fineness should increase toward the bottom, while the bottom tray should be provided with bone-black or other suitable clarifying material.

$c\,z$ and $c\,y$ represent the clarifying and filtering material, which may be any suitable substance.

$c\,x$ represent wire-gauze or other suitable material, which will prevent the filtering and clarifying material from being carried through with the juices. The bottoms of the trays should be perforated, as shown.

$c\ u$ are ledges upon which the trays rest.

$c\ v$ are packing-strips placed between the tray and ledge for the purpose of making a tight joint and preventing the juices from escaping at the sides and ends of the trays.

$c\ m$ are the induction-pipes leading to the pipes $b\ y$, $c\ a$, $b\ z$, and $c\ b$, which in turn join the main pipe $c\ d$.

$c\ i$ and $c\ j$ are cross-fittings for connecting the different pipes. $c\ o$ are eyes or staples in the sides of the filtering devices, to which one end of the springs $c\ t$ are attached, while the other end is attached to a rod which terminates in a handle, $c\ s$.

$c\ r$ are bars extending across the ends of the fronts $c\ h$ of the trays $c\ w$. The ends of these bars are slotted, so as to receive the rods when the handles are brought forward, and by the force of the spring a tight joint is formed in connection with the packing $c\ q$.

In Fig. 16, E$^p$ represents a plan view of an improved evaporating pan for evaporating saccharine juices. This pan is made of suitable depth and diameter, the interior of which is divided into a spiral channel by a plate, K$^2$; or, if preferable, the pan can be cast with the spiral partition therein and afterward galvanized or otherwise suitably prepared for use.

$l'$ is a coil of pipe laid in the spiral channel.

W K is a plate of sheet metal fitted into two of the spiral channels, and extends about one-third around the circumference of the channel; or it may extend the complete circle or any part thereof, and also one, two, or more of the channels may be so provided. The lower end of this plate drops down to near the bottom of the channel, or it may rest on the coil, while the other end rises to near the top of the channel, or a suitable distance above the line of the sirup or juice. About one-half or two-thirds of the length of these plates are perforated for the purpose of allowing the juice or sirup to flow around in the channels, while the remaining portion of the plate is left blank for the purpose of receiving the scum which floats upon the surface. As the scum accumulates it is gradually forced out of an opening, which is shown in dotted lines at J K, while the sirup passes around and is discharged at F G. Steam enters the coil at H I and is discharged at $q^2$.

$v^2$ is the point at which the saccharine matter enters the spiral channel.

Fig. 17 is a vertical section of the evaporating-pan E$^p$.

$l$ is the cover, which is bolted to the rim of the pan.

K$^2$ represents the division-plate which forms the spiral channel. This plate is riveted to the bottom of the pan at $d\ k$.

$l'$ is the coil, and $d\ j$ are devices for keeping the coil from lying on the bottom of the channel, thus allowing a free circulation beneath the said coil.

X Z is a boss or fitting riveted to the bottom of the pan, and in which the pipe $v^2$ is screwed, the end of which extends into the pan and forms a nipple to receive the device L M, which is for the purpose of preventing or breaking and destroying the force of the upward flow when the saccharine matter is discharged from the trap.

W X represent the plate for separating the scum from the saccharine juice or sirup. $d\ i$ represent the line of the juice or sirup as it flows down the channel.

N O and P Q represent a glass and the manner of securing it to the cover, the purpose of which is to afford a means to watch the operation of the evaporation and the flow of the sirup.

$q^2$ is the discharge-pipe for the steam-coil. This pipe extends upward through the cover $l$, and is held securely by the fittings X Y and Y Z.

Z$^2$ is the steam-escape pipe from the pan, and to accelerate the evaporation and the discharge of the steam the ejecting devices T U and R S are employed. The steam from the coil is discharged from the nozzle T U through the open end of R S, thus creating a partial vacuum in $z^2$ and the pan and expediting the escape of the steam. V W is a connection uniting the pipe $q^2$ with the ejector.

Having thus fully described the nature of the invention and the construction and arrangement of the various parts thereof, the description hereinafter set forth will be devoted to the operation thereof.

The portable quintuple-effects sugar-works are at first drawn onto the plantation and placed in position in some suitable locality, which may be contiguous to the cane crop, or at any suitable point within the boundary of the cane-field, after which the works must be leveled and the proper connections made between the several parts, as follows: the steam-connection between the heating device B A and the engine L, or between some steam-generator and said engine; the connections between the rollers and the engine, the rollers and the cane and bagasse-carriers, the filtering devices and defecating-tanks, the exhaust and heating coils in the defecating-tanks, the defecating-tanks and filtering and clarifying devices, the clarifying devices and evaporating apparatus. In order to commence the operation of crushing the cane-stalks, water will have to be forced into the heating apparatus B A and steam generated therefrom until the second defecating-tank is filled with juice, which flows from the rollers through the interchangeable filters $a$, and thence through a pipe or pipes into the tanks U, where it is heated by the exhaust-steam from the engine L, or from steam obtained from some other source. Said steam passes through coils of pipe within an interior cylinder, U$^2$. By means of this cylinder, which is provided with a perforated rim, a current is formed by the action of the heat within the inner cylinder, which causes the juice to rise and flow through the perforations, and thence down between the inner cylinder and the inner circumference of the tank U to the bottom thereof, and under the lower edge of the inner cylinder, and thence upward, and again returned through the perforations. Thus a current is formed which will continue while the steam heat is applied. By the action of this current the coagulated matter and other impurities are carried to the surface and forced beyond the surface of the juice, which is represented by the dotted line $b$ over the angle formed by the incline surface V and the annular recess V', after which the impurities escape through the pipe $B^2$. This action can be continued until nearly all of the impurities are eliminated from the saccharine juices. These tanks U can be inclosed with close-fitting covers, which can be provided with a low-pressure safety device for the escape of the steam which may be generated therein; or this steam may escape through the pipe $B^2$. Therefore, by these means or devices, as above described, the saccharine juices can be defecated without coming in contact with the atmosphere. While the defecating process is in operation in the first tank the second tank is being filled. When filled the steam is turned off from the first tank and onto the second one, while the cane-juice is run into the third tank. Now, while the defecating and filling are in operation in the second and third tanks the defecated juice in the first tank is being forced by the pumps $b\,r$ into the heating device B A; but when it is deemed necessary to filter and clarify the defecated juice it is caused to pass through a series of interchangeable filtering and clarifying devices, and thence through the pump to the heating device. These filtering and clarifying devices are so constructed and arranged that any one of the set can be, when clogged and necessary to be cleaned, cut off from the tank and pump, and afterward taken apart and cleaned, after which the parts are replaced and the corresponding valves opened between the device, tank, and pump. The construction of this set of filtering devices is not limited to what is shown in the drawings, for more or less of these devices may be employed, and also the area which contains or holds the filtering and clarifying material can be diminished or increased as occasion requires. A set of filtering and clarifying devices can be interposed between the separator $g^2$ and the first evaporating-pan 1 $E^p$, whereby the semi-sirup can be purified before entering the first pan. After the first tank has been depleted of its defecated juices the juice is turned on and the valve leading from the eduction-pipe is closed and the tank again refilled. The steam is now cut off from the second tank and turned onto the third tank to defecate the juice therein, and in the meantime valve 32 in eduction-pipe $d\,e$ is opened, and the defecated juice in the second tank is drawn therefrom and through the filtering and clarifying devices by the pump and forced into the heating device B A, where it is heated prior to its discharge therefrom into a separator, where a limited amount of the aqueous liquid is evolved to steam and conducted away to a dome for subsequent use; or it may, when not wanted for use, escape through suitable safety devices into the open air, while the saccharine matter and the remaining aqueous liquid is forced through a suitable device or devices into an evaporating-pan for subsequent treatment.

The evaporating-pans herein described and employed in connection with the herein-described apparatus are made with a spiral inclined channel, which is about three inches in width, more or less, and of any desirable depth. At or near the bottom of said channel a spiral coil is located, through which steam or hot gases are conducted for the purpose of imparting additional heat to the aqueous and saccharine matter which may pass over said spiral coil. The substance to be evaporated is introduced at the center of the bottom of the pan, or it may be introduced at the top, or at any other convenient place; and, also, the introduction of the substance to be evaporated at the circumference and the discharge of the current at the center would not be a departure from the principle hereinbefore enunciated; and, furthermore, a device for automatically removing the scum from the surface of the current can be affixed at the center and perform the same function that is required of the automatic skimming device shown in the last two spiral channels at the circumference in Fig. 16. These evaporating-pans can be made in other forms and embrace the principles herein shown and described. Thus it will be observed that by proper management the process of filtering the juice after leaving the rollers and filling the tanks therewith, and defecating the juice therein, and drawing the defecated juices therefrom through the filtering and clarifying device, and forcing it into and through the heating device and evaporating-pans, is conducted, without intermittent action in any stage of the operation, from the time the cane enters the rollers until the saccharine product contained therein is discharged from the last pan in the form or condition of refined crystallizable sirup.

The specific construction and arrangement of the heating-coils and their adjuncts, the specific construction of the pressure-rolls and adjuncts, and the specific construction of the interchangeable filters, together with the processes carried out by these devices, are not claimed in this application, as they form the subject of separate applications, in which I reserve to myself the right to claim them.

What I claim, and desire to secure by Letters Patent, is—

1. In the manufacture of sirup and sugar, the process of concentrating the saccharine liquid which consists in forcing it under pressure in an occluded condition, to prevent carbonization, through a conduit subjected to the heat of a furnace and into a separator or expansion-chamber outside of the furnace, for separating the steam and vapor from the saccharine matter.

2. In the manufacture of sirup and sugar, the process of concentrating the saccharine liquid which consists in forcing it under pressure from the upper or cooler portion of a conduit through and out of the hottest portion thereof into a separator or expansion-chamber, where the aqueous vapor is separated from the saccharine liquid or sirup, for the purpose specified.

3. In the manufacture of sirup and sugar, the process of concentrating the saccharine liquid which consists in forcing it under pressure in a continuous stream or streams through a heated conduit or conduits from a cooler to the hottest portion thereof and discharging it into an expansion-chamber for the separation of the steam from the liquid or sirup.

4. In the manufacture of sirup and sugar, the process of concentrating the saccharine liquid and utilizing the steam eliminated therefrom, which consists in forcing such liquid under pressure through a heated conduit in an occluded condition and discharging it into a closed separator or expansion-chamber and conducting the steam therefrom to an engine or other places of use.

5. In the manufacture of sirup and sugar, the process of concentrating the saccharine liquid which consists in forcing it under high pressure through a dry-heated conduit in an occluded condition and discharging it into a separator and forcing the resulting partially-concentrated sirup therefrom into an evaporating device or devices, where the concentration is completed.

6. The process of evaporating a saccharine liquid which consists in passing it through a channel in a pan over a steam-coil in which superheated steam moves in an opposite direction to the flowing liquid, whereby the liquid is subjected to a rising or increasing temperature and the heat of the steam more fully utilized.

7. In the evaporation of a saccharine liquid, the process of automatically removing the scum therefrom, which consists in causing the liquid to flow through a heated channel against and through inclined perforated skimming devices in a continuous current, whereby the scum is automatically forced from the pan.

8. In the defecation of saccharine juice, the process of automatically removing the coagulated and other impurities therefrom, which consists in causing the juice to circulate by heat from a central cylinder through a perforated section at the top thereof into the outer cylinder and back again repeatedly, and thus force the impurities in the form of scum over the top of the inner cylinder into an annular gutter, and thus conducting them away from the defecator.

9. The process of manufacturing sugar which consists in subjecting the freshly-expressed juice to the defecating process, filtration, evaporation, and concentration in closed vessels without exposure to the air, whereby oxidation and carbonization are prevented and a better product produced.

10. In combination with the dry-heating coils or conduits, a high-pressure forcing device and an evaporating-pan for receiving the heated liquid, for the purpose described.

11. The combination, with the heating coils or conduits having an induction-pipe entering their upper or cooler portion and an eduction-pipe leading from their lower or hottest portion, of a forcing device and an evaporating-pan.

12. The heating coils or conduits, an evaporating-pan, and an interposed trap, in combination with a suitable forcing device for forcing the liquid to be evaporated into the coils or conduits located in a furnace and on into the pan.

13. A vacuum-pan having an inclined bottom, a spiral division-plate secured thereto, forming a spiral channel, and a steam heating-coil in the channel, in combination with an induction-pipe for liquid entering the upper portion of the channel, and a stopping device located in front of such pipe for breaking the current of the incoming forced juice.

14. An evaporating-pan having a suitable channel and heating devices in connection therewith, in combination with an inclined skimmer or skimmers and separators located in one or more of the channels for automatically skimming the liquid, substantially as described.

15. A closed evaporating-pan having a steam-escape pipe, in combination with a steam heating-coil therein, having a jet-nozzle terminating in said steam-escape pipe, operating as and for the purpose described.

16. Two or more closed evaporating-pans, in combination with one or more trapping devices interposed between the pans for conducting the liquid from pan to pan.

17. In combination with evaporating apparatus, a defecating device consisting of an outer tank, an inner chamber communicating therewith at the bottom, and having at the top a perforated section connecting with a recess or gutter for conducting away the scum.

18. A defecating device consisting of an outer tank and an inner open-bottomed steam-heated cylinder having at its top an inclined perforated rim.

19. A defecating device consisting of an outer tank and an inner open-bottomed cylinder, in combination with the steam heating-coils for causing circulation of the juice.

20. The described defecating device, in combination with a central tube, a screw-threaded nut, a screw-threaded shaft, and a cross-bar for raising and lowering the tank.

21. In combination with the evaporating apparatus and the defecating devices, the interchangeable filters interposed between them.

22. In combination with the evaporators and heating-coils, the defecating-tanks, the interposed filters, and a pump for drawing the juice through the filters and forcing it into the heating-coils.

23. The portable sugar-works, consisting of the combination of the pressure-rolls, the defecating-tanks, and the evaporating apparatus, mounted in a suitable frame on wheels, for the purpose described.

24. In a portable sugar-works, the evaporating apparatus, in combination with the pressure-rolls and the necessary adjuncts thereto, made of steel, whereby the maximum capacity is retained with a minimum amount of metal and lightness and durability secured, and the whole mounted on wheels, for the purpose specified.

WM. FRANK BROWNE.

Witnesses:
J. C. TURNER,
R. D. O. SMITH.